United States Patent
Rungta et al.

(10) Patent No.: US 10,248,471 B2
(45) Date of Patent: Apr. 2, 2019

(54) LOCKLESS EXECUTION IN READ-MOSTLY WORKLOADS FOR EFFICIENT CONCURRENT PROCESS EXECUTION ON SHARED RESOURCES

(71) Applicant: Oracle International Corporation, Redwood Shores, CA (US)

(72) Inventors: Raunak Rungta, Foster City, CA (US); Jonathan Giloni, Brooklyn, NY (US); Ravi Shankar Thammaiah, Redwood Shores, CA (US); Sumanta Kumar Chatterjee, Menlo Park, CA (US); Juan Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 222 days.

(21) Appl. No.: 15/267,104

(22) Filed: Sep. 15, 2016

(65) Prior Publication Data
US 2018/0074865 A1    Mar. 15, 2018

(51) Int. Cl.
  G06F 9/46    (2006.01)
  G06F 9/52    (2006.01)
  G06F 1/24    (2006.01)

(52) U.S. Cl.
  CPC .............. *G06F 9/526* (2013.01); *G06F 1/24* (2013.01)

(58) Field of Classification Search
  None
  See application file for complete search history.

(56) References Cited

U.S. PATENT DOCUMENTS

| | | | |
|---|---|---|---|
| 6,965,893 B1 | 11/2005 | Chan et al. | |
| 7,346,720 B2 | 3/2008 | Fachan | |
| 7,447,786 B2 | 11/2008 | Loaiza et al. | |
| 7,600,063 B2 | 10/2009 | Loaiza et al. | |
| 9,244,738 B2 | 1/2016 | Bibolet et al. | |
| 2007/0239915 A1* | 10/2007 | Saha | G06F 9/526 710/200 |

OTHER PUBLICATIONS

Roy et al; A Runtime System for Software Lock Elision, EuroSys'09 (Year: 2009).*

* cited by examiner

*Primary Examiner* — Bing Zhao
(74) *Attorney, Agent, or Firm* — Vista IP Law Group, LLP

(57) ABSTRACT

Systems for managing shared computing resources. In a multi-process computing environment a concurrency object data structure pertaining to a shared resource is made available to be accessed by two or more processing entities. The concurrency object comprises a consecutive read count that tracks the number of consecutive read requests that have been received for shared read access to the shared resource. A shared concurrency access state is entered based on comparison of the consecutive read count to a threshold value. Entering the shared concurrency access state begins a period during which grant of further shared access requests do not require semaphore operations or other atomic operations that pertains to the shared resource.

20 Claims, 12 Drawing Sheets

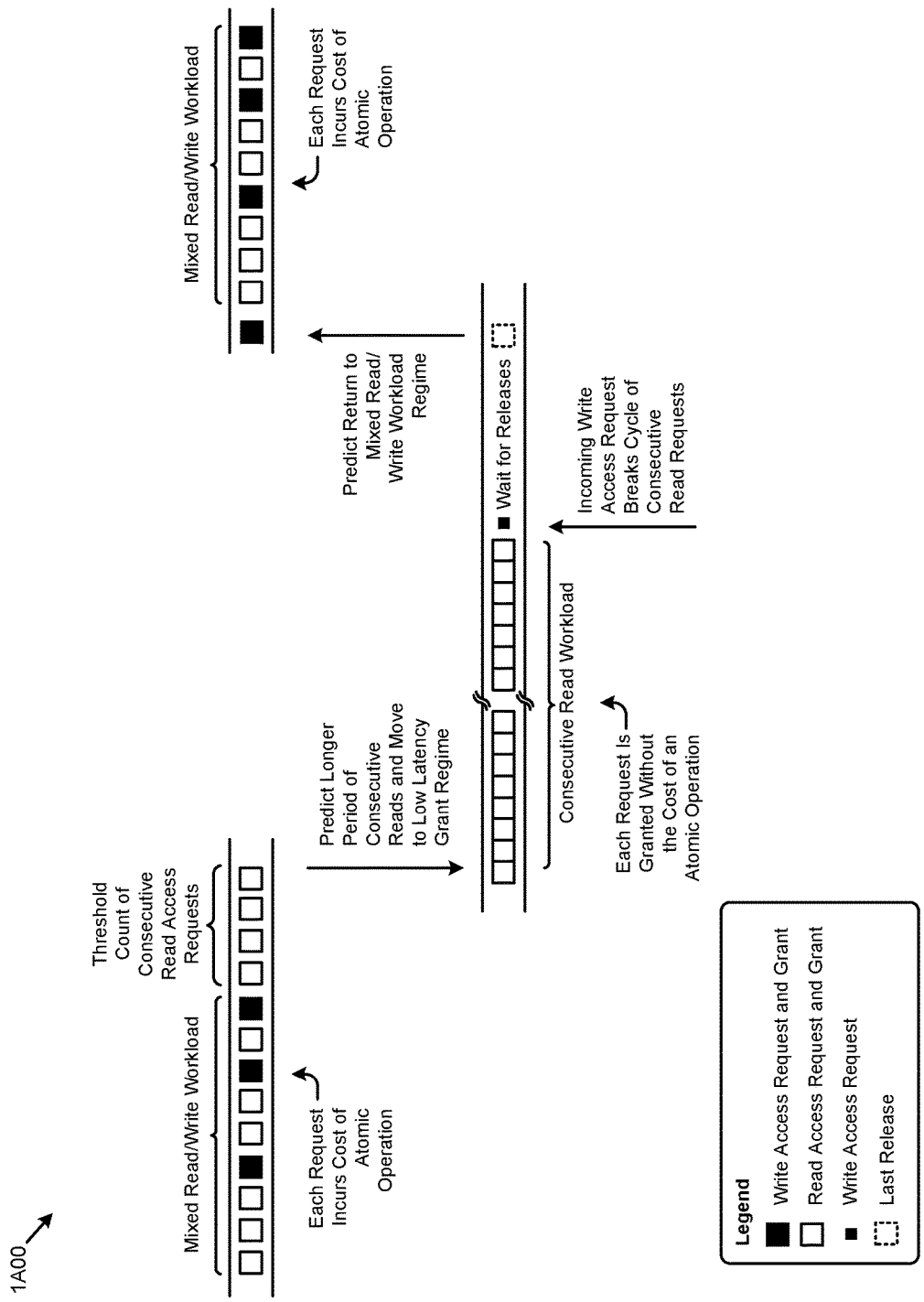
FIG. 1A1

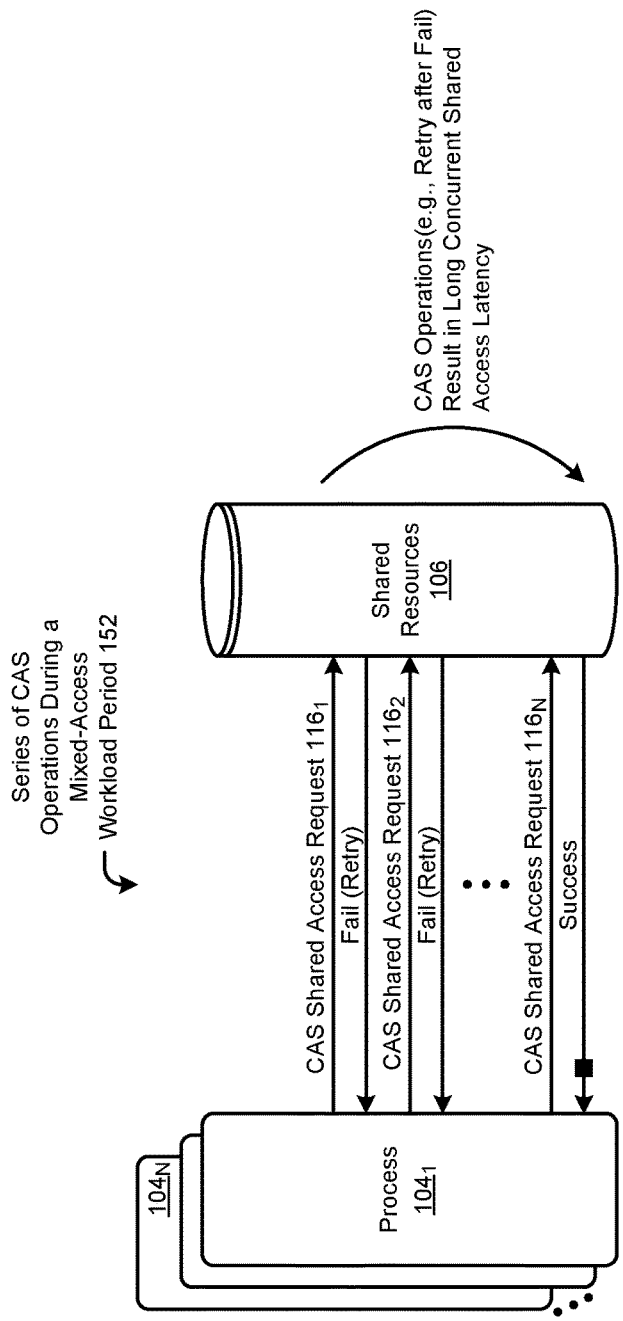
FIG. 1A2

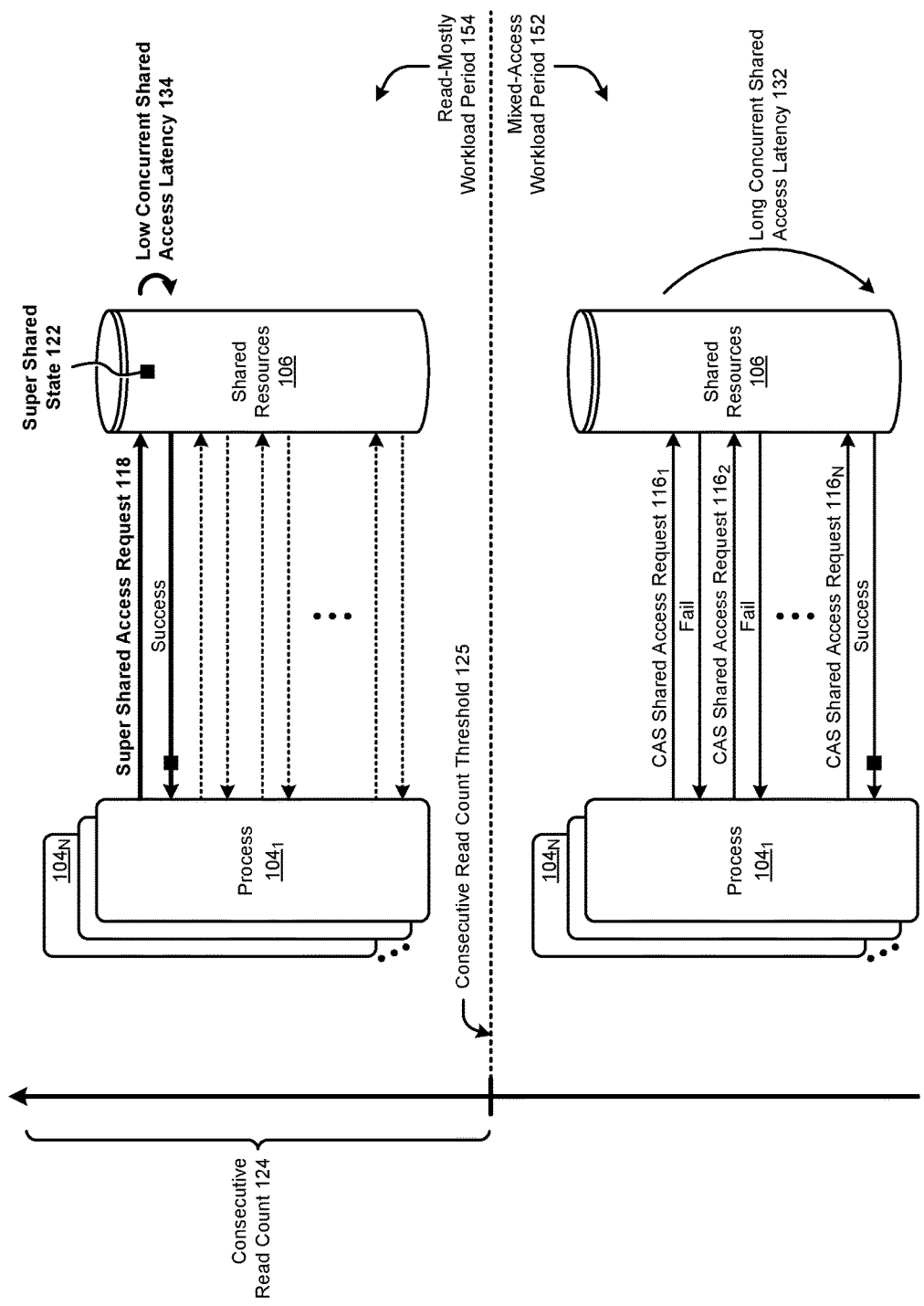
FIG. 1A3

LOCKLESS EXECUTION IN READ-MOSTLY WORKLOADS FOR EFFICIENT CONCURRENT PROCESS EXECUTION ON SHARED RESOURCES

FIELD

This disclosure relates to managing shared computing resources, and more particularly to techniques for lockless execution during read-mostly workload periods.

BACKGROUND

In modern computing systems, multiple processes and/or threads may want to access a shared set of computing resources and/or data resources. For example, distributed (e.g., cloud-based) computing systems can facilitate concurrent access to certain shared data files and/or shared databases and/or shared database tables by managing access requests by various processes that are invoked by applications or collaborating users. The operations pertaining to such access requests can vary. Some read-centric operations, such as a data item read or file view, might merely read the resource without modifying the resource. Other processes, such as a data write or file delete, might modify the resource.

In all cases, any processes that might be executed concurrently while using a given resource are expected to cooperate in their respective read/write operations so as to produce consistent results. A computing system can facilitate such resource access concurrency using various locking techniques. Such locking techniques can serve to prevent destructive interactions with a given resource that, for example, might incorrectly update and/or alter the resource between a series of accesses to the resource. Some locking techniques implement an atomic operation, such as a test-and-set or compare-and-swap (CAS) operation, to manage access to shared resources.

Unfortunately, legacy techniques for managing access to shared resources can present limitations, at least in their ability to facilitate low latency resource access for read-only processes. Specifically, in some legacy approaches, a reading process might perform a CAS or other atomic operation as part of the locking technique to gain access to the shared resource. When a large number of read processes are contending for a shared resource, only one succeeds and the remaining processes repeat the CAS operation so as to (eventually) gain access to the resource. In many cases, the CAS operations might be initiated from processes on different computing nodes, or even from processes on nodes in different computing clusters. Performing a CAS or other atomic operation can be expensive, at least as pertaining to the number of processor cycles required to execute the compare-and-swap. Moreover, when a given process performs many failed CAS operations before a successful CAS operation to gain access to the resource, the latency for acquiring the resource increases, which in turn can decrease the overall performance (e.g., throughput) of the computing system.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The drawings described below are for illustration purposes only. The drawings are not intended to limit the scope of the present disclosure.

FIG. 1A1, FIG. 1A2 and FIG. 1A3 illustrate an efficient concurrent access technique as implemented in systems that facilitate low latency access to shared objects during periods of contiguously-successive read-only access requests, according to some embodiments.

DETAILED DESCRIPTION

Figure 1B:
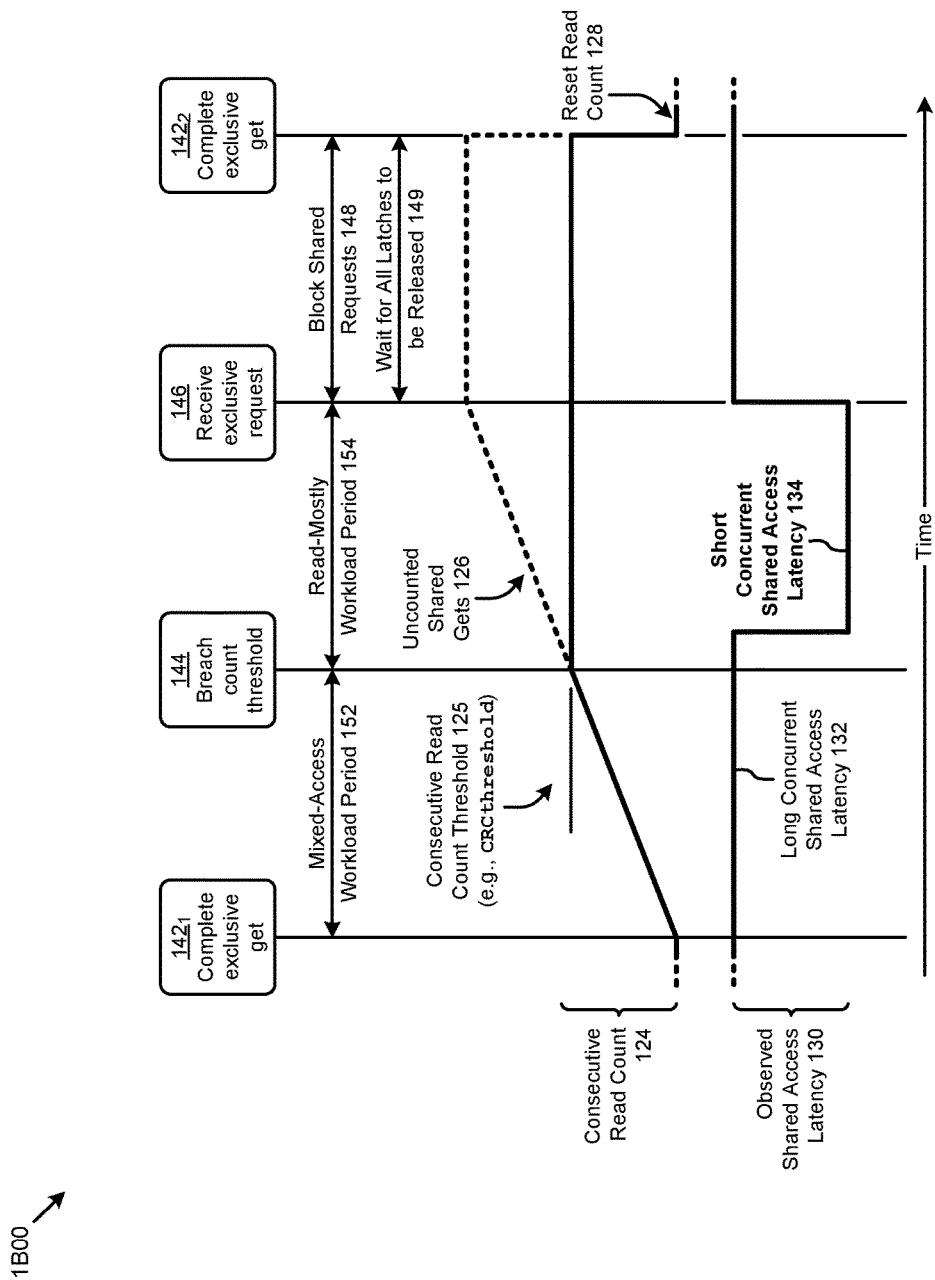
FIG. 1B illustrates a consecutive read request tracking technique as implemented in systems that facilitate low latency access to shared objects during periods of contiguously-successive read-only access requests, according to some embodiments.

Some embodiments of the present disclosure address the problem of efficient read-only access to shared resources in a highly concurrent environment. Some embodiments are directed to approaches for tracking the number of consecutive read accesses of a shared resource to invoke a low latency concurrent access protocol to the shared resource. The accompanying figures and discussions herein present example environments, systems, methods, and computer program products for lockless execution in read-mostly workloads (efficient concurrent read process execution on shared resources).

Overview

In some embodiments, a concurrency object, specifically a data structure composed of a bit field or other storage elements, is used to manage concurrent access to a shared resource. The concurrency object can include a counter to track the number of consecutive readers of the shared resource since the last exclusive access of that shared resource. For example, the counter can be incremented by 1 when the shared resource is accessed in a shared mode (e.g., for read-only access), and reset to 0 when the shared resource is acquired in an exclusive mode (e.g., for write access). When the counter breaches a certain threshold (e.g., such as can occur for read-mostly workloads), shared access processes can access the shared resource using a low latency latch acquisition technique. Specifically, in certain embodiments, breaching the threshold can invoke a super shared mode, which super shared mode facilitates shared access to the shared resource without a CAS or other atomic operation.

In certain embodiments, the concurrency object can include a conversion bit to indicate a request for exclusive access occurring while in super shared mode. In some embodiments, the conversion bit can further be used to block requests for shared access while in super shared mode. Even in the presence of a read-mostly workload, there may come a moment in time when an exclusive access request is issued by a process. The exclusive access can be granted after all of the outstanding latches have been released by their respective readers. Low-latency techniques for providing a grant (e.g., a latch) to a reader that do not involve atomic operations, as well as techniques for determining when the outstanding grants have been released by their respective readers are presented hereunder.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A1, FIG. 1A2 and FIG. 1A3 illustrate an efficient concurrent access technique 1A00 as implemented in systems that facilitate low latency access to shared objects during periods of contiguously-successive read-only access requests. As an option, one or more variations of efficient concurrent access technique 1A00 or any aspect thereof may be implemented in the context of the architecture and functionality of the embodiments described herein. The efficient concurrent access technique 1A00 or any aspect thereof may be implemented in any environment.

As shown, requests to access a shared resource occur as an interleaved mixture of read requests followed by write requests and followed by more intermixed read and write requests in any interleaving pattern. Each request is satisfied upon success of a compare-and-swap (CAS) or other atomic operation (e.g., to increment a counter). At some point an unbroken run of contiguously-successive read-only access requests is detected to have occurred (e.g., at the shown threshold of four consecutive read requests). That event, namely surpassing a threshold number of consecutive read requests, is deemed to be a prediction that further incoming requests will also be read requests. The event of surpassing a threshold number of consecutive read requests moves into a regime where, so long as there are no incoming write requests, further incoming read requests are granted without reliance on a CAS or other atomic operation. When at some point an incoming write access request is received, a wait period is entered and then exited when all outstanding read grants have been released. The event of the received write access request is deemed to predict a return to a mixed read/write workload. Atomic operations are again used to manage access requests.

FIG. 1A2 depicts a system where multiple processing entities represented by process $104_1, \ldots,$ process $104_N$, etc. access a set of shared resources 106. The processing entities might be invoked by multiple physical and/or virtual computing devices and/or machines in a distributed computing environment. In such environments, the processing entities can exhibit highly concurrent shared resource access activity, which access activity can comprise shared access requests and/or exclusive access requests to obtain shared access (e.g., read access) and/or exclusive access (e.g., write access) to the shared resources (e.g., a data object). For example, as shown, process $104_1$ might request shared access to shared resources 106 by issuing a shared access request comprising a CAS operation (e.g., CAS shared access request $116_1$). In this case, the CAS operation can implement a locking technique to gain access to shared resources 106. When a large number of processes are contending for shared resources 106, there is a high likelihood that a particular request will not be granted on the process's first attempt (see "Fail (Retry)", as shown). In such cases, the process $104_1$ can repeat the CAS shared access request (e.g., CAS shared access request $116_2$, . . . , CAS shared access request $116_N$) until the request is successful and the shared access is provisioned such that the shared resource access is granted to the shared access process (e.g., process $104_1$). Such successful provisioning can be referred to as a "shared get".

In many cases, the CAS operation can be expensive at least as pertaining to the number of processor cycles required to execute the compare-and-swap. When a given process (e.g., process $104_1$) performs many failed CAS shared access requests before a successful CAS operation to gain access to the resource, the latency incurred to acquire access to the resource can become long. Moreover, geographic distribution of nodes in a computing system can incur even longer latencies. For example, a CAS operation executed on a remote node in a non-uniform memory access (NUMA) system can have a longer latency as compared to a CAS operation executed on a local node in a NUMA-aware system. Still more, although some approaches might implement an exponential request delay (e.g., "back-off") technique between successive retry attempts, a large number of processes may continue retry attempts, introducing latency in gaining access to the resource.

Some systems implement a NUMA-aware locking techniques, however, such NUMA-aware locking techniques allocate memory for managing the lock according to the number of NUMA nodes in a given system, which can result in the blocking of each cache line associated with each of the CPU cores in the system. Some approaches implement an atomic operation bypass technique using speculative hardware lock elision (HLE). However, such HLE implementations are limited to only computing devices having certain architectures, such as an X86 architecture.

The foregoing long latency issues and/or other issues attendant to efficient read-only access to shared resources in a highly concurrent environment can be addressed by the herein disclosed techniques. Specifically, and as shown in FIG. 1A3, such techniques can monitor a consecutive read count 124 to identify a transition between a mixed access period (e.g., mixed-access workload period 152) that is characterized by at least some exclusive access activity and a shared access period (e.g., read-mostly workload period 154) that is characterized by at least some contiguous shared access activity with no intervening exclusive access activity. Specifically, and as shown, when consecutive read count 124 (e.g., number of contiguously-successive shared gets) is less than a consecutive read count threshold 125, then the highly concurrent environment can be characterized as being in a mixed-access workload period 152. When consecutive read count 124 is greater than or equal to a consecutive read count threshold value (e.g., consecutive read count threshold 125), then the pattern can be deemed to form a preamble to a read-mostly workload period 154. When the read-mostly workload period 154 is entered, the herein disclosed techniques can implement a super shared state 122 associated with the shared resources. Super shared state 122 facilitates shared access to shared resources 106 using merely one shared access request (e.g., super shared access request 118). Since a single instance of super shared access request 118 can result in provisioning access to shared resources 106 (e.g., successful request), a short concurrent shared access latency 134 can be achieved.

When an incoming write request is received, the event of the received write access request is deemed to predict a return to a mixed read/write workload. A wait state is entered so as to wait for all outstanding grants to be released, and upon that event, the consecutive read count counter is reset to zero. The time period to wait for confirmation of release of outstanding or pending shared access grants may be a short period, or it might be a longer period. After confirmations of releases of pending shared access grants, the flow moves to processing the incoming exclusive access request, and atomic operations are again used to manage incoming shared access requests, as is shown in the bottom of FIG. 1A3.

Further details pertaining to tracking a consecutive read count 124 to facilitate the herein disclosed techniques is shown and described as pertaining to FIG. 1B.

FIG. 1B illustrates a consecutive read request tracking technique 1B00 as implemented in systems that facilitate low latency access to shared objects during periods of contiguously-successive read-only access requests. As an option, one or more variations of consecutive read request tracking technique 1B00 or any aspect thereof may be implemented in the context of the architecture and functionality of the embodiments described herein. The consecutive read request tracking technique 1B00 or any aspect thereof may be implemented in any environment.

FIG. 1B depicts the earlier described processes, represented by process $104_1$, accessing shared resources 106 in a multi-process computing system. As shown, process $104_1$ and/or other processes might issue a request for shared access (e.g., a shared get, resource read, etc.) of shared resources 106. In other cases, process $104_1$ and/or other processes can issue a request for exclusive access (e.g., exclusive get, resource write, etc.) of shared resources 106. The performance of the highly concurrent multi-process computing system can be characterized at least in part by latency to acquire access to the resource. During periods of contiguously-successive shared access requests the herein disclosed techniques can decrease observed latency at least as compared to the latency during periods of mixed shared and exclusive access.

Specifically, as shown in FIG. 1B, the herein disclosed techniques can decrease observed shared access latency 130 from a long concurrent shared access latency 132 (during the mixed-access workload period 152) to a short concurrent shared access latency 134 (during the read-mostly workload period 154). More specifically, the consecutive read request tracking technique 1B00 can facilitate the foregoing latency decrease by tracking a consecutive read count 124 (e.g., CRC) following completion of a certain exclusive get request that pertains to the shared resource (at operation $142_1$). In certain embodiments, the CRC can be included (e.g., as an object attribute, metadata, relational table data, etc.) in a concurrency object (e.g., a data structure) that is used to manage concurrent access to resources that are shared among any number of processing entities.

For example, in one management scenario according to the present disclosure, each contiguously-successive shared get following the completion of the exclusive get can be counted in CRC until a consecutive read count threshold 125 (e.g., CRCthreshold) is breached (at operation 144). Consecutive read count threshold 125 (e.g., CRCthreshold=1, 000) can be based on user input, historical shared resource access activity, and/or other information. A consecutive read count 124 that is greater than or equal to consecutive read count threshold 125 (e.g., CRC≥CRCthreshold) can indicate a read-mostly workload 154 such that the concurrency objects 108 protecting the shared resources 106 can be transitioned to a super shared state to facilitate short concurrent shared access latency 134. For example, process $104_1$ and/or other processes can access shared resources 106 using a decreased number (e.g., 0) of atomic operations (e.g., CAS operations) when shared resources 106 are in a super shared state. During this period, shared gets might not be counted (e.g., see uncounted shared gets 126).

Concurrency objects 108 can remain in such a super shared state until an exclusive access request is received (at operation 146). Responsive to receiving the exclusive access request, further shared access requests may be blocked (at operation 148) while the then-current or pending shared gets are executed. When the pending shared gets have been executed, the exclusive get can be completed (at operation 142$_2$). In certain embodiments processing of the exclusive access request includes waiting until all of the pending shared gets have been completed and their respective latches have been released (at operation 149).

In this and other embodiments, the completion of the exclusive get resets the CRC (e.g., at reset read count 128).

Figure 1C:
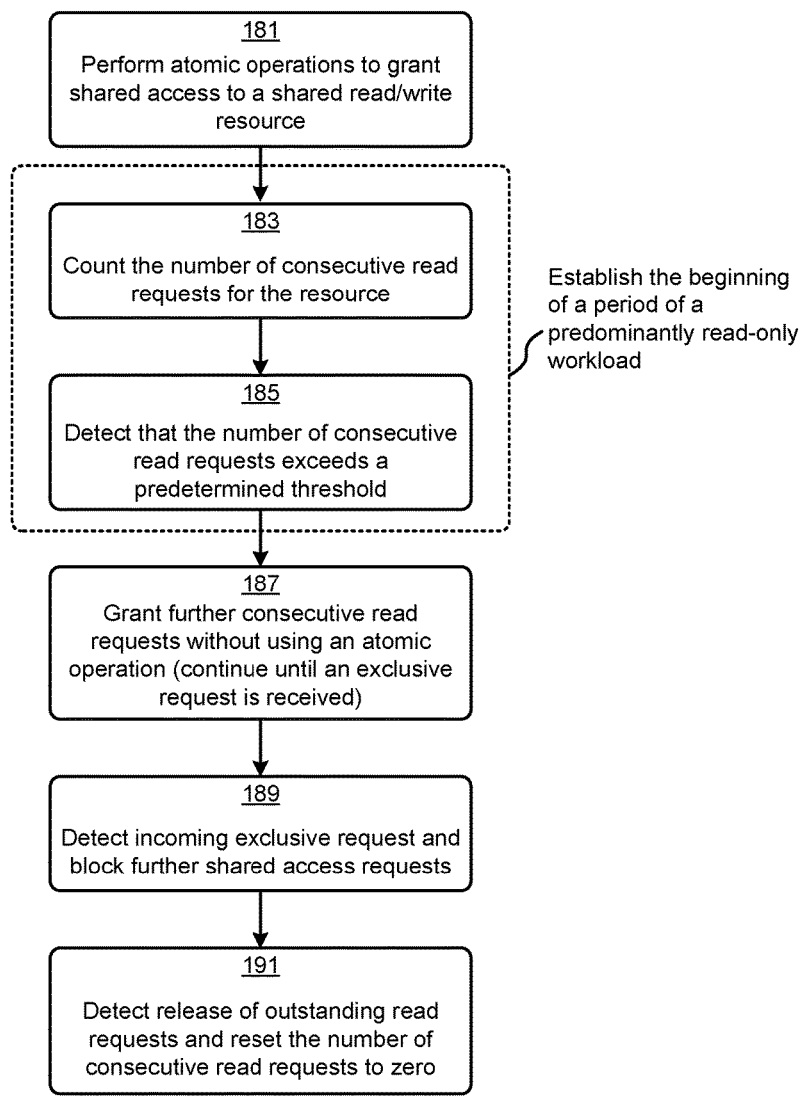
FIG. 1C presents a flowchart showing a consecutive read request tracking technique as implemented in systems that facilitate low latency access to shared objects during periods of contiguously-successive read-only access requests, according to some embodiments.

FIG. 1C presents a flowchart 1C00 showing a consecutive read request tracking technique as implemented in systems that facilitate low latency access to shared objects during periods of contiguously-successive read-only access requests.

The shown flow commences upon performing atomic operations to grant shared access to a shared read/write resource (step 181). Upon performing the atomic operation, count the number of consecutive read requests for the resource (step 183). A write request or any type of exclusive request will interrupt a consecutive series of read requests, however if no write request or any type of exclusive request is received, then the system continues counting consecutive read requests for the resource until detecting that that the number of consecutive read requests exceeds a predetermined threshold (step 185).

The detection that that the number of consecutive read requests exceeds a predetermined threshold establishes a period of a read-mostly workload. Continue to grant further consecutive read requests, however without using an atomic operation. Continue until an exclusive request is received (step 187), at which point upon detecting an incoming exclusive request, then block further shared access requests (step 189). Wait until releases of the group of previously granted read requests have been verified, and then reset the number of consecutive read requests to zero (step 191). One technique used to verify that previously granted read requests have been released is to scan a process table or set of processing entity tables that contains an a priori known value that indicates the status of a latch (e.g., if an access grant has been released or not). This scan can be repeated as many times as needed until it is deemed that all grants have been released.

A segment of pseudocode to scan processing entity tables is presented in the following Table 1:

TABLE 1

Scan operations pseudocode

| Ref | Information |
|---|---|
| 1 | /* Wait until all processes have released */ |
| 2 | db_latch *latch; |
| 3 | proc_latch_state *proclatst = NULL; |
| 4 | for (i = 0; i < num_processes; i++) |
| 5 | { |
| 6 |    proclatst = get_process_latch_state(i); |
| 7 |    /* wait till process i is not holding the latch */ |
| 8 |    do { |
| 9 |      if (! Is_process_holding_latch(proclatst, latch)) |
| 10 |        break; |
| 11 |      else |

TABLE 1-continued

Scan operations pseudocode

| Ref | Information |
|---|---|
| 12 |        do_wait(N); |
| 13 |    } while(TRUE); |
| 14 | } |

In some cases, a processing entity might have terminated before the scan. In such cases, process termination routines (e.g., of the operating system) might have released the latches. In other cases the semantics of a detected absence of a processing entity table can be interpreted to mean that the processing entity has released its latches or is no longer reliant on any latches.

Figure 1D:
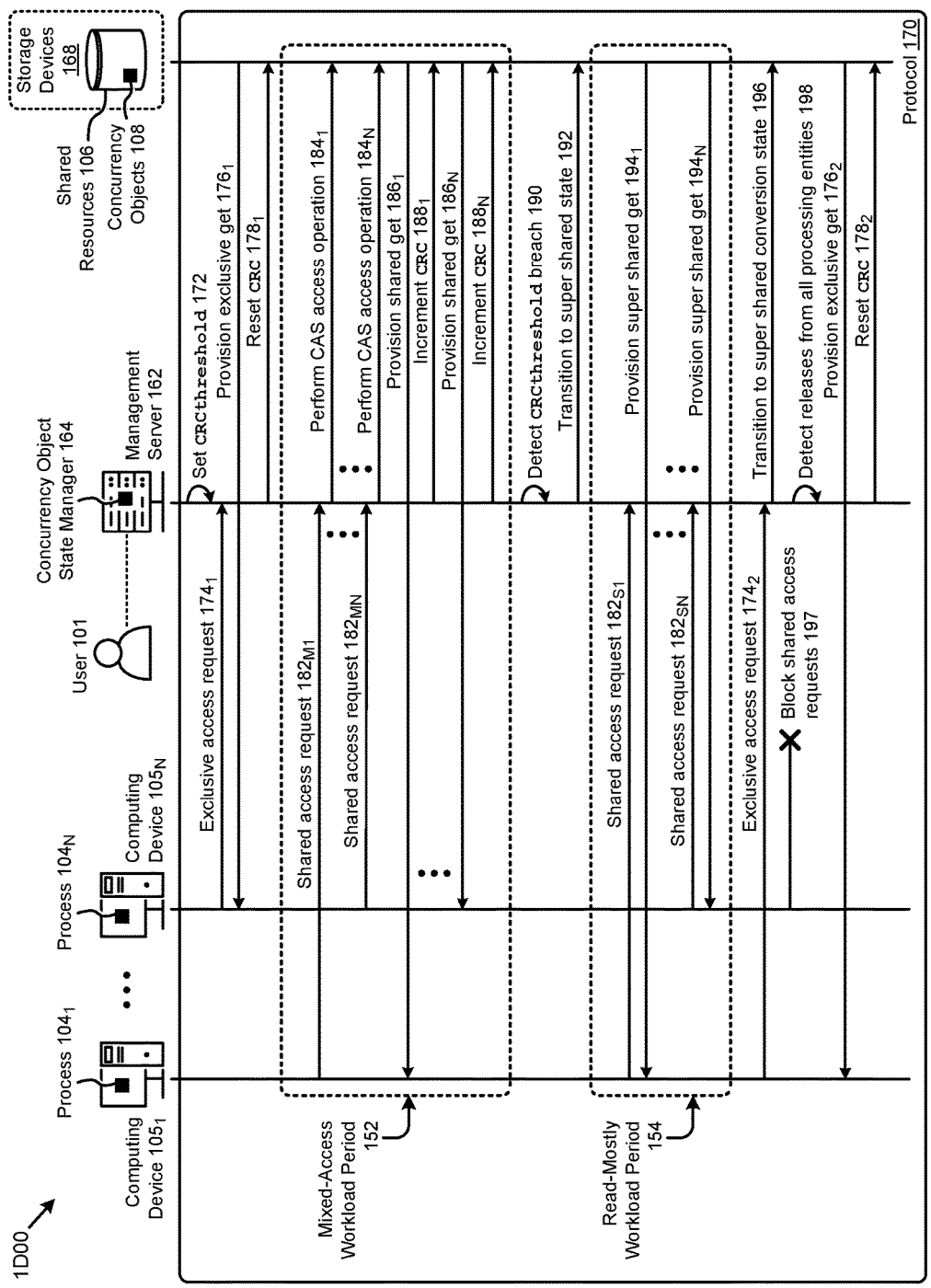
FIG. 1D exemplifies an operating environment that supports a protocol for low latency access to shared objects during periods of contiguously-successive read-only access requests, according to some embodiments.

One embodiment of an environment and protocol supporting the foregoing and/or herein disclosed techniques for facilitating low latency access to shared objects during periods of contiguously-successive read-only access requests is shown and described as pertaining to FIG. 1D.

FIG. 1D exemplifies an operating environment 1D00 that supports a protocol for low latency access to shared objects during periods of contiguously-successive read-only access requests. As an option, one or more variations of operating environment 1D00 or any aspect thereof may be implemented in the context of the architecture and functionality of the embodiments described herein.

As shown in FIG. 1D, operating environment 1D00 comprises various computing systems (e.g., servers, devices, storage facilities, etc.) that can interact (e.g., communicate) to facilitate the herein disclosed techniques. Such computing system might be interconnected by one or more networks. Such networks can comprise any combination of a wide area network (e.g., WAN), a local area network (e.g., LAN), a cellular network, a wireless LAN (e.g., WLAN), or any such means to facilitate communication by and between computing systems. The networks can also collectively be referred to as the Internet.

More specifically, operating environment 1D00 can comprise at least one instance of a management server 162 to manage shared resources 106 stored in a set of storage devices 168. Specifically, in some embodiments, a concurrency object state manager 164 can be implemented in management server 162 to manage concurrency objects 108 associated with shared resources 106. In some cases, a user 101 (e.g., system administrator) can interact with the concurrency object state manager 164 at management server 162. The servers and storage devices shown in operating environment 1D00 can represent any single computing system with dedicated hardware and software, multiple computing systems clustered together (e.g., a server farm, a host farm, etc.), a portion of shared resources on one or more computing systems (e.g., a virtual server), or any combination thereof. For example, management server 162 and storage devices 168 can comprise a highly concurrent multi-process computing system.

Operating environment 1D00 further comprises instances of computing devices (e.g., computing device 105$_1$, . . . , computing device 105$_N$) that can represent one of a variety of other computing devices (e.g., a smart phone, a tablet, a WiFi phone, a laptop, a workstation, etc.) having processes (e.g., process 104$_1$, . . . , process 104$_N$) that can concurrently request access to shared resources 106. In some cases, a respective user or set of users can interact with the computing devices to invoke the concurrent requests. Computing device 105$_1$, . . . , computing device 105$_N$, management server 162, and storage devices 168 can exhibit a set of high order interactions (e.g., operations, messages, etc.) in a protocol 170 to facilitate the herein disclosed techniques. More specifically, and as shown, the CRCthreshold can be established at management server 162 (operation 172). For example, user 101 might specify a value of 1,000 for the CRCthreshold. Management server 162 might further receive an exclusive access request from process $104_N$ at computing device $105_N$ (message $174_1$). Responsive to the exclusive access request, an exclusive get of shared resources 106 can be provisioned to process $104_N$ (message $176_1$). According to the herein disclosed techniques, the completion of the exclusive get can trigger a reset of CRC (message $178_1$).

As shown, a certain portion of the interactions exhibited among the computing systems in operating environment 1D00 can correspond to a mixed-access workload period 152. As an example, a certain period of time following an exclusive get (e.g., message $176_1$) can be considered "mixed-access" since the exclusive get may indicate a high likelihood of another instance of an exclusive request being issued. During the mixed-access workload period 152, concurrent shared access requests can be received at management server 162 from the computing devices (message $182_{M1}, \ldots,$ message $182_{MN}$), which shared access requests can invoke a respective atomic operation (e.g., CAS operation) used by a locking technique implemented to manage concurrent requests for access to shared resources 106 (message $184_1, \ldots,$ message $184_N$). In response to the shared access requests, a respective instance of a shared get can be provisioned to the requestor (message $186_1, \ldots,$ message $186_N$). Responsive to provisioning a shared get, the CRC can be incremented (e.g., CRC=CRC+1) at the concurrency objects 108 (message $188_1, \ldots,$ message $188_N$).

At some moment in time, a breach of CRCthreshold can be detected (operation 190). Specifically, for example, the CRCthreshold breach can indicate CRC is greater than or equal to CRCthreshold. The CRCthreshold can be set to identify a boundary between a mixed-access workload period 152 and a read-mostly workload period 154. Responsive to identifying a read-mostly workload period 154 (e.g., CRC≥CRCthreshold), concurrency objects 108 protecting the shared resources 106 can be transitioned to a super shared state according to the herein disclosed techniques (message 192). For example, one or more instances of concurrency objects 108 can be modified to indicate the transition to the super shared state. Further, a certain portion of the interactions exhibited among the computing systems in operating environment 1D00 can correspond to the read-mostly workload period 154.

For example, concurrent shared access requests can be received at management server 162 from the computing devices (message $182_{S1}, \ldots,$ message $182_{SN}$), which shared access requests can invoke a respective instance of a super shared get provisioned to the requestor (message $194_1, \ldots,$ message $194_N$). In such cases, for example, the super shared gets can be provisioned without any, or at least with a decreased number of, atomic operations (e.g., test-and-set operations, CAS operations). Such concurrent super shared access can continue until an exclusive access request is received at management server 162 (message $174_2$). The concurrency objects 108 protecting the shared resources 106 can then be transitioned to a SUPER SHARED CONVERSION state (message 196). For example, one or more instances of concurrency objects 108 can be modified to indicate the transition to the SUPER SHARED CONVERSION state. When concurrency objects 108 are in the SUPER SHARED CONVERSION state, any shared access requests received at management server 162 can be blocked (operation 197) while the pending shared requests received at a moment in time prior to the moment in time the exclusive request is received are completed (e.g., released). When release of the last of the gets is detected (operation 198), the exclusive get can be provisioned (message $176_2$). The completion of the exclusive get can trigger a reset of CRC (message $178_2$).

As earlier described, instances of concurrency objects 108 can facilitate concurrent access to shared resources 106 by storing information pertaining to a state, a lock value, and/or other characteristics of shared resources 106. One example of a set of states and/or other information pertaining to certain shared resources is shown and described as pertaining to FIG. 2A.

Figure 2A:
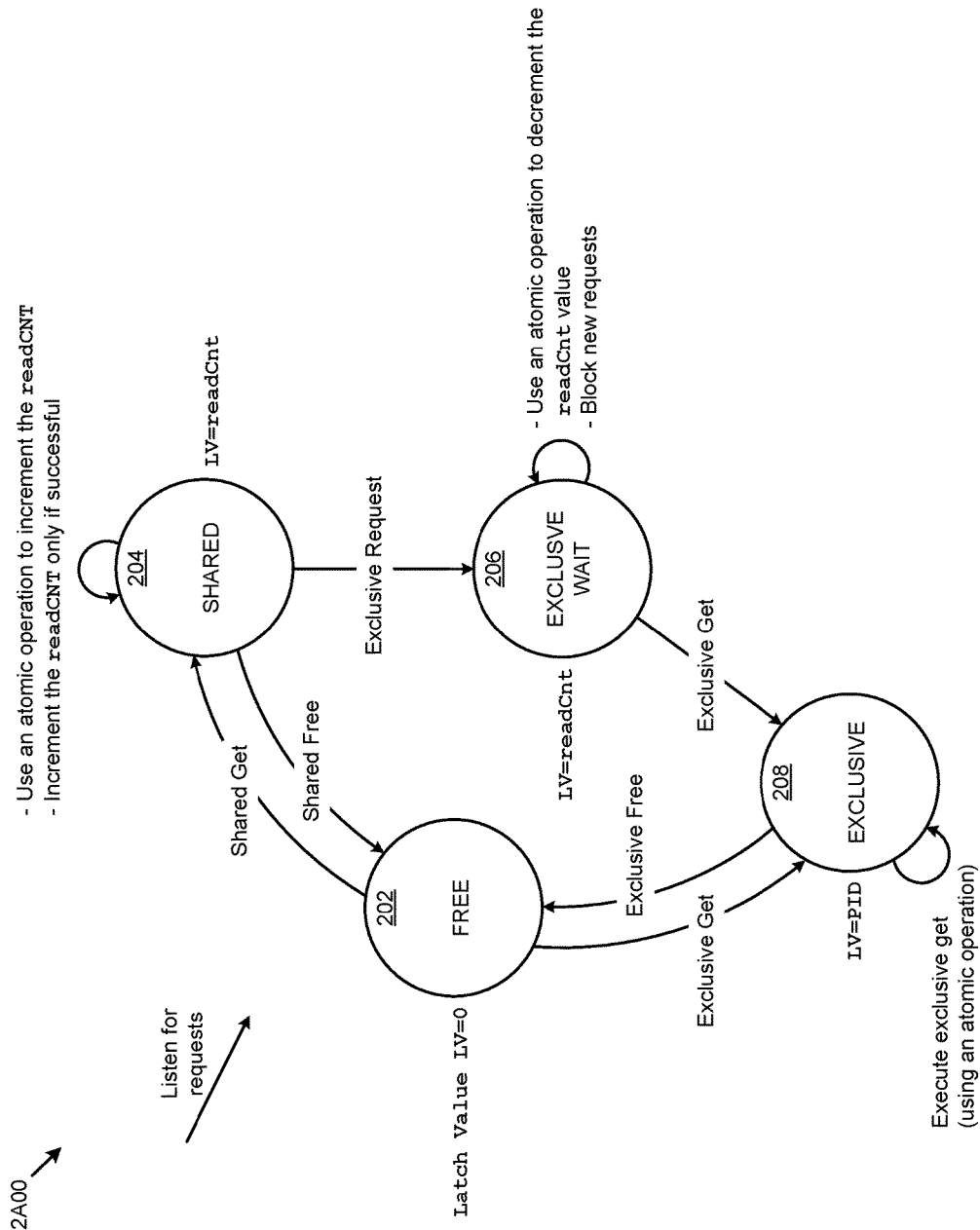
FIG. 2A depicts a concurrency object state diagram for managing concurrent access to shared resources.

FIG. 2A depicts a concurrency object state diagram 2A00 for managing concurrent access to shared resources using a data structure having at least one state variable capable of holding state values. As an option, one or more variations of concurrency object state diagram 2A00 or any aspect thereof may be implemented in the context of the architecture and functionality of the embodiments described herein. The concurrency object state diagram 2A00 or any aspect thereof may be implemented in any environment.

As shown in FIG. 2A, a set of four states can be implemented (e.g., in a concurrency object data structure) to manage access to shared resources in a highly concurrent distributed computing environment. In some embodiments, the states can be codified into one or more state variables within a concurrency object data structure. State variables can be implemented as memory locations that can hold a range of state values that are managed by a concurrency object state manager such as the concurrency object state manager 164 shown and described as pertaining to FIG. 1D. As further shown, the concurrency object state manager can listen for shared resource access requests while the concurrency object is in any of the four states. Specifically, shared resource access requests can be received while a concurrency object has a state value corresponding to a "FREE" state (state 202).

A latch value of 0 (e.g., LV=0) stored in the concurrency object can indicate there are no processes holding the shared resource latch (e.g., no processes provisioned access). When one or more shared gets are provisioned in response to shared access requests, the state can be transitioned to a "SHARED" state (state 204) having a corresponding state value. In the SHARED state, the latch value can indicate the number of processes concurrently holding the latch for shared access (e.g., LV=readCnt). When the shared gets are executed (e.g., readCnt is decreased to 0), the state can be transitioned from the SHARED state to the FREE state.

Exclusive access requests can also be received while the concurrency object is in the FREE state. In such cases, the state can be transitioned to an "EXCLUSIVE" state (state 208) to execute a corresponding exclusive get. In the EXCLUSIVE state, the latch value can correspond to the process identifier of the process holding the latch for exclusive access (e.g., LV=PID). When the exclusive get is executed (e.g., LV is cleared and/or set to 0), the state can be transitioned from the EXCLUSIVE state to the FREE state. An exclusive request can further be received when the concurrency object is in the SHARED state. In such cases, the state of the concurrency object can be transitioned to an "EXCLUSIVE WAIT" state (state 206). In the EXCLUSIVE WAIT state, any shared access requests received can be blocked. For example, such blocking might be facilitated by setting a certain bit in the concurrency object to a high or low value. When all earlier received shared gets are executed (e.g., readCnt is decreased to 0), the state can be transitioned from the EXCLUSIVE WAIT state to the EXCLUSIVE state to execute the exclusive get.

In some cases, a given process can issue numerous failed shared access requests comprising one or more atomic operations (e.g., CAS operations) before obtaining the latch to execute the shared get in the SHARED state. For example, to obtain a latch in the SHARED state, each process might perform a CAS operation to update the latch value in the concurrency object. This operation takes expected_value (e.g., 10) and new_value (e.g., 11=expected_value+1) as arguments, and replaces the latch value with the new_value if the latch value matches the expected_value. If the latch value does not match the expected_value (e.g., already updated by one or more other processes), then the operation fails and the process continues retrying until it succeeds. In such cases, the latency from a first issued shared access request to completion of the shared get can be long. The herein disclosed techniques can improve shared access latencies by implementing concurrency object states that can be used during read-mostly workload periods. One embodiment of such states are shown and described as pertaining to FIG. 2B.

Figure 2B:
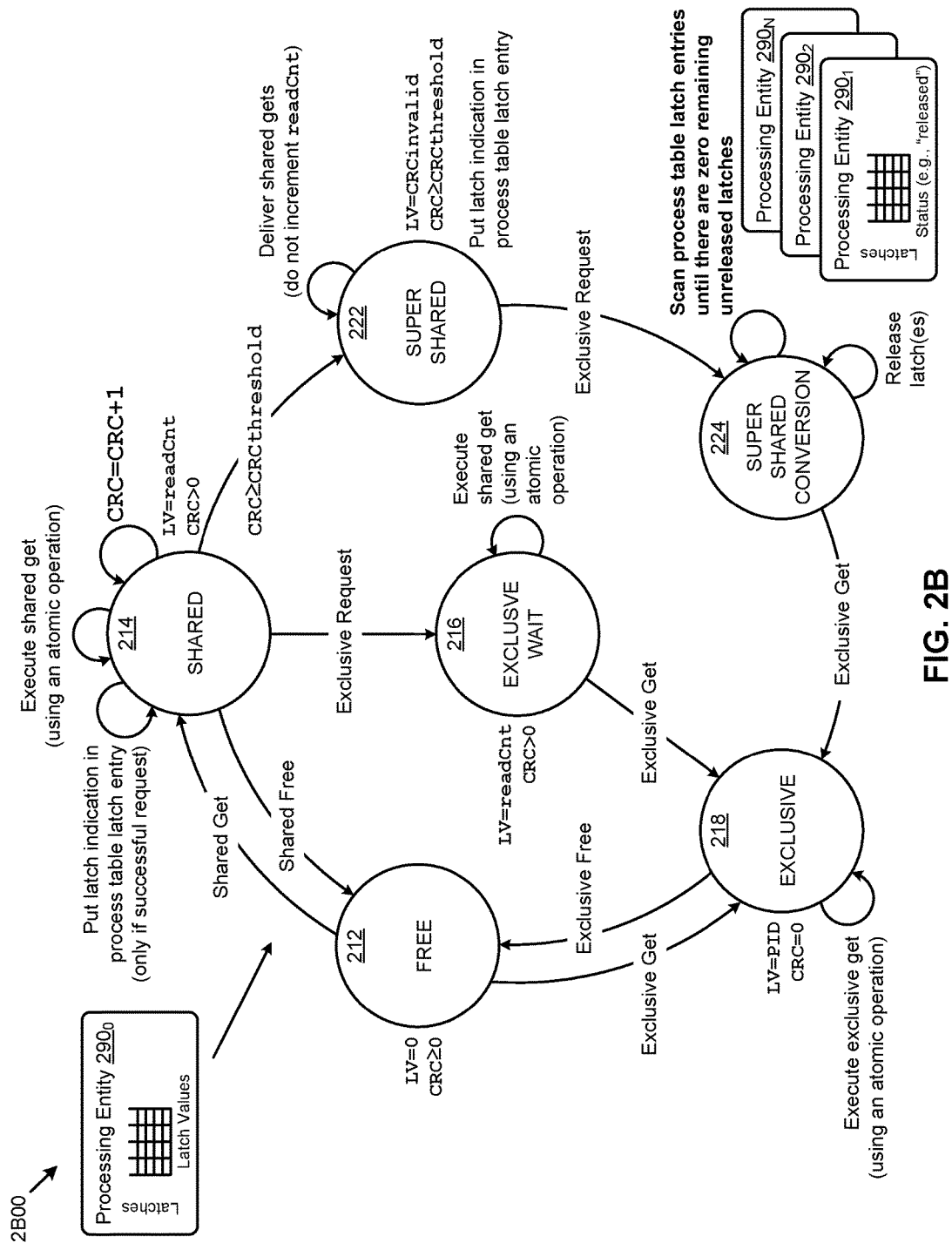
FIG. 2B depicts a state diagram with super shared state transitions as implemented in systems exhibiting periods of contiguously-successive read-only access requests, according to some embodiments.

FIG. 2B depicts a state diagram 2B00 with super shared state transitions as implemented in systems exhibiting periods of contiguously-successive read-only access requests. As an option, one or more variations of super shared state transitions or any aspect thereof may be implemented in the context of the architecture and functionality of the embodiments described herein. The super shared state transitions or any aspect thereof may be implemented in any environment.

As shown in FIG. 2B, a set of six states can be implemented to manage access to shared resources in a highly concurrent distributed computing environment. In some embodiments, the states can be codified into one or more instances of concurrency objects (e.g., tables or data structures comprising state variables and their values) that are managed by a concurrency object state manager, which in turn has a state machine implementation that listens for incoming communications from any number of processing entities (e.g., the shown processing entity $290_0$). Some examples of concurrency objects and implementations of a concurrency object state manager 164 are shown and described as pertaining to FIG. 1D.

As further shown in FIG. 2B, the state machine listen for shared resource access requests while the concurrency object is in any of the six states. Specifically, shared resource access requests can be received while a concurrency object is in a "FREE" state (state 212). A latch value of 0 (e.g., LV=0) stored in the concurrency object can indicate there are no processes holding the shared resource latch. The concurrency object can further store a consecutive reader count indicating the then-current number of contiguously-successive shared gets (e.g., CRC≥0). When one or more shared gets are provisioned in response to shared access requests, the state can be transitioned to a "SHARED" state (state 214). In the SHARED state, the latch value can indicate the number of processes concurrently holding the latch for shared access (e.g., LV=readCnt). Further, the consecutive reader count can be incremented for each executed shared get (e.g., CRC=CRC+1). When the shared gets are executed (e.g., readCnt is decreased to 0), the state can be transitioned from the SHARED state to the FREE state.

Exclusive access requests can be received while the concurrency object is in the FREE state. In such cases, the state can be transitioned to an "EXCLUSIVE" state to execute a corresponding exclusive get (state 218). In the EXCLUSIVE state, the latch value can correspond to the process identifier of the process holding the latch for exclusive access (e.g., LV=PID). When the exclusive get is executed (e.g., LV is cleared and/or set to 0), the state can be transitioned from the EXCLUSIVE state to the FREE state. The consecutive read count can also be reset responsive to completing the exclusive get (e.g., CRC=0). An exclusive request can further be received when the concurrency object is in the SHARED state. In such cases, the state of the concurrency object can be transitioned to an "EXCLUSIVE WAIT" state (state 216). In the EXCLUSIVE WAIT state, any shared access requests received can be blocked. For example, such blocking might be facilitated by setting a certain bit in the concurrency object to a high or low value. When all earlier received shared gets are executed (e.g., readCnt is decreased to 0), the state can be transitioned from the EXCLUSIVE WAIT state to the EXCLUSIVE state to execute the exclusive get.

When the consecutive read count breaches a certain threshold (e.g., CRC≥CRCthreshold) while in the SHARED state, the shared resource can transition to a "SUPER SHARED" state (state 222), which has a corresponding state value. In the SUPER SHARED state, shared gets can be provisioned without any atomic operations (e.g., CAS operations). The latch value in the SUPER SHARED state can indicate the consecutive read count is not tracked (e.g., LV=CRCinvalid) and/or indicate the state of the shared resource (e.g., a bit is set to indicate a SUPER SHARED state). Such concurrent super shared access can continue until an exclusive access request is received, which exclusive access request precipitates a transition from the SUPER SHARED state to a "SUPER SHARED CONVERSION" state (state 224). In the SUPER SHARED CONVERSION state, any shared access requests received can be blocked. For example, such blocking might be facilitated by setting a state conversion indicator (e.g., conversion bit) in the concurrency object to a high or low value. When all earlier received shared gets are executed (e.g., all earlier gets have released their shared resource latch), the state can be transitioned from the SUPER SHARED CONVERSION state to the EXCLUSIVE state to execute the exclusive get.

When in the SUPER SHARED state, the readCNT variable is not being updated, thus avoiding expensive atomic operations. Still, in order to transition from the SUPER SHARED CONVERSION state to the EXCLUSIVE state, all outstanding latches have to be verified as having been released. As shown during the SUPER SHARED CONVERSION state, a data structure or data structures pertaining to the status of latches granted to a particular processing entity (e.g., processing entity $290_1$, processing entity $290_2$, processing entity $290_N$) is scanned for occurrence of any outstanding (e.g., not yet "released") latches. This scan can reach into data structures that are within the process space of the respective processing entity, or the scan can access a shared data structure, or, in some cases such a data structure is allocated and managed by the concurrency object state manager. One technique is to scan processing entity tables for occurrences of an $\alpha 0$ priori known value that indicates the status of a latch (e.g., if an access grant has been released or not). Using whichever technique or techniques, this scan is repeated as many times as needed until it is deemed that the all latch grants have been released.

Figure 3A:
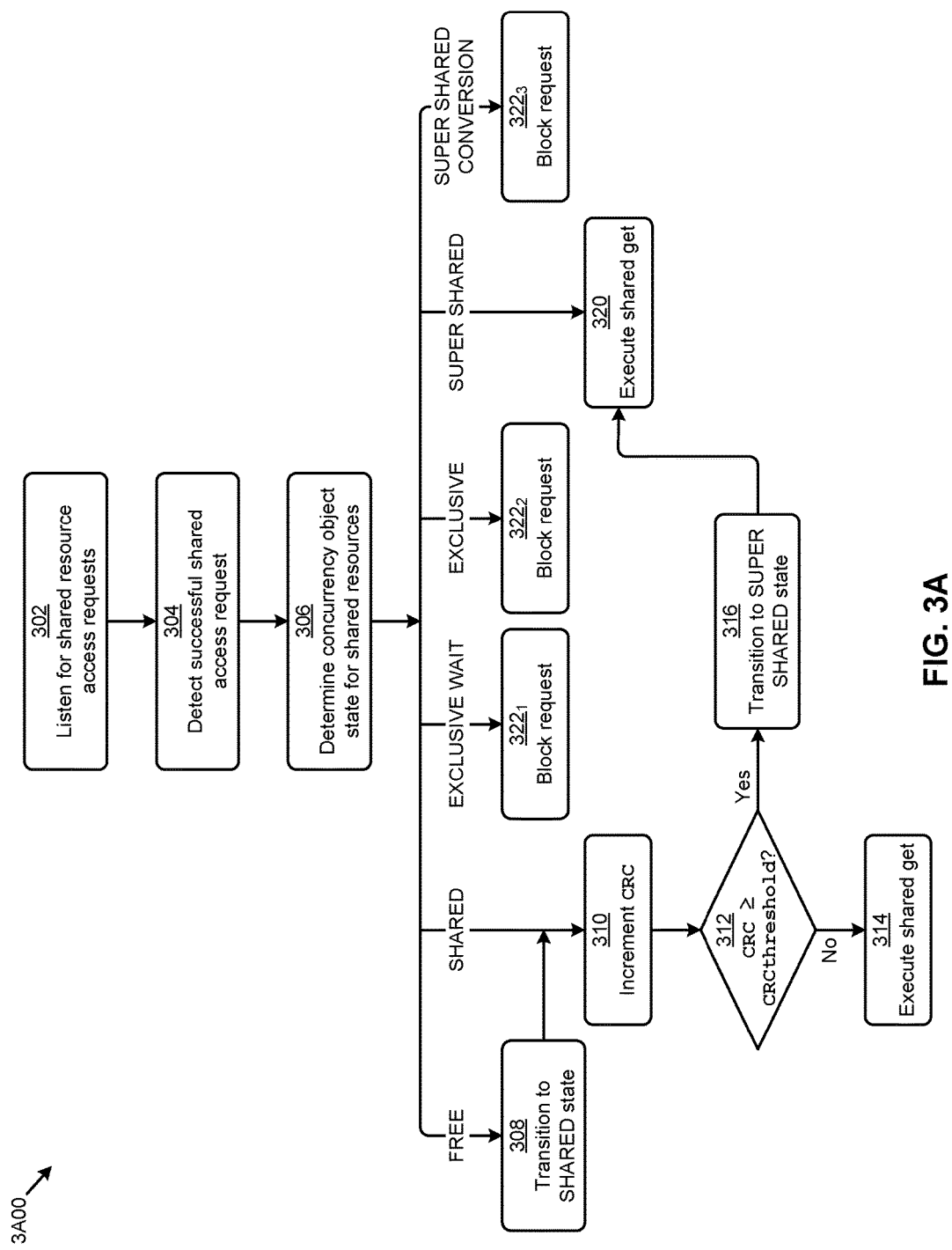
FIG. 3A presents a low latency shared access management technique as implemented in systems exhibiting periods of contiguously-successive read-only access requests, according to some embodiments.

A technique for implementing the foregoing concurrency object states so as to manage shared access requests in systems exhibiting read-mostly workload periods is shown and described as pertaining to FIG. 3A.

FIG. 3A presents a low latency shared access management technique 3A00 as implemented in systems exhibiting periods of contiguously-successive read-only access requests. As an option, one or more variations of low latency shared access management technique 3A00 or any aspect thereof may be implemented in the context of the architecture and functionality of the embodiments described herein. The low latency shared access management technique 3A00 or any aspect thereof may be implemented in any environment.

The low latency shared access management technique 3A00 presents one embodiment of certain steps and/or operations for facilitating managing shared access requests in systems exhibiting read-mostly workload periods according to the herein disclosed techniques. In one or more embodiments, the steps and underlying operations comprising low latency shared access management technique 3A00 can be executed by an instance of the concurrency object state manager 164 as shown and described in FIG. 1D and herein.

As shown in FIG. 3A, low latency shared access management technique 3A00 can listen for shared resource access requests (at step 302). When a successful shared access request is detected (at step 304), the concurrency object state for the requested shared resource can be determined (at step 306). If the concurrency object is in the FREE state, the concurrency object state can be transitioned to the SHARED state (at step 308). When a successful shared access request is detected in the SHARED state or invokes a transition to the SHARED state, the CRC is incremented (at step 310). If the CRC is less than the CRCthreshold (see "No" path of decision 312), then the shared get can be executed from the SHARED state (at step 314). In some cases, the concurrency object state might be transitioned to the FREE state when the shared get is completed. If the CRC is greater than or equal to the CRCthreshold (see "Yes" path of decision 312), then the concurrency object state can transition from the SHARED state to the SUPER SHARED state (at step 316). When a successful shared access request is detected in the SUPER SHARED state, or invokes a transition to the SUPER SHARED state, the shared get can be executed from the SUPER SHARED state (at step 320). When the shared access request is detected in the EXCLUSIVE WAIT state, the EXCLUSIVE state, or the SUPER SHARED CONVERSION state, the shared access request can be blocked (at step $322_1$, step $322_2$, and step $322_3$, respectively).

Figure 3B:
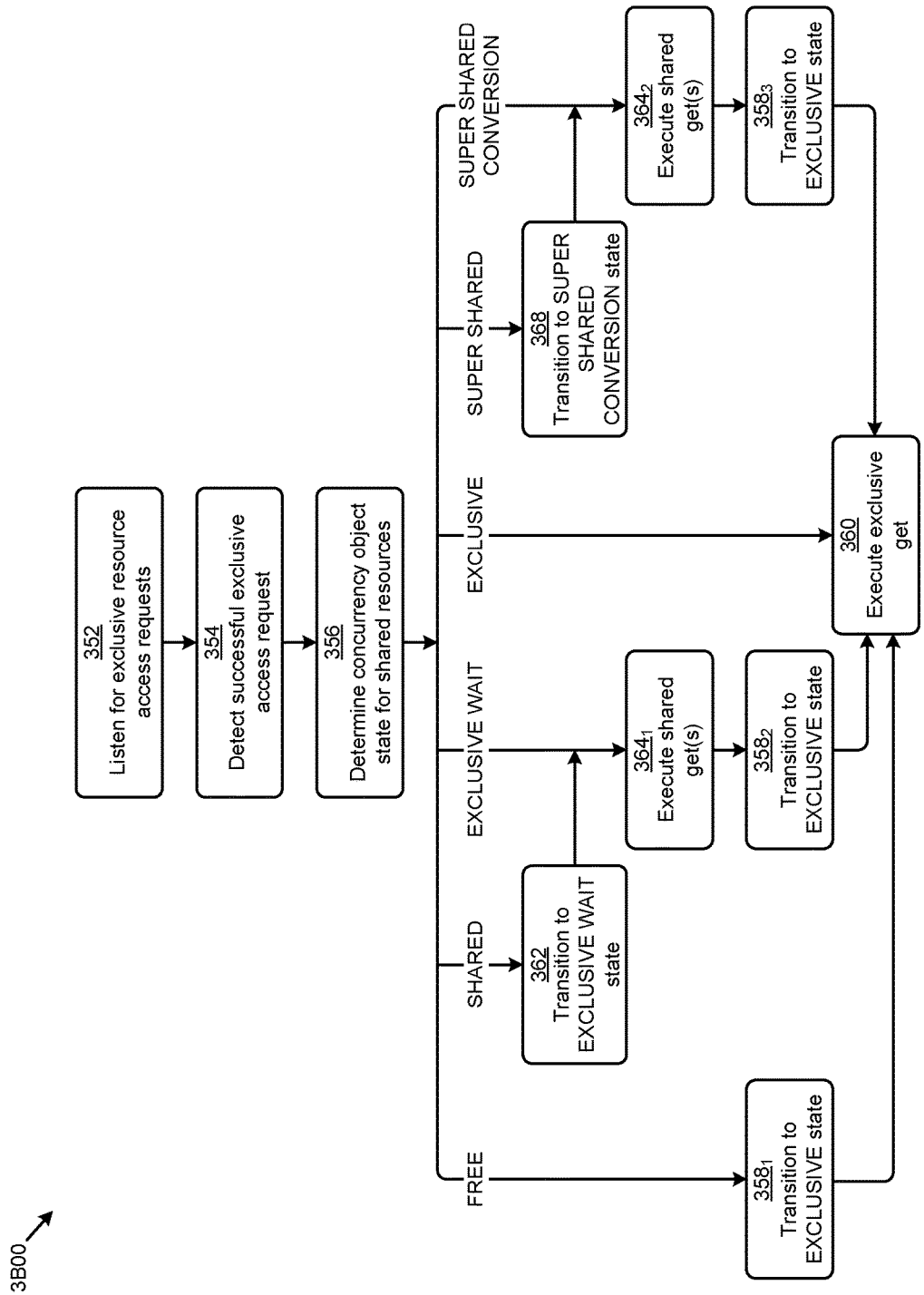
FIG. 3B presents an exclusive access management technique as implemented in systems exhibiting periods of contiguously-successive read-only access requests, according to some embodiments.

A technique for implementing the earlier described concurrency object states to manage exclusive access requests in systems exhibiting read-mostly workload periods is shown and described as pertaining to FIG. 3B.

FIG. 3B presents an exclusive access management technique 3B00 as implemented in systems exhibiting periods of contiguously-successive read-only access requests. As an option, one or more variations of exclusive access management technique 3B00 or any aspect thereof may be implemented in the context of the architecture and functionality of the embodiments described herein. The exclusive access management technique 3B00 or any aspect thereof may be implemented in any environment.

The exclusive access management technique 3B00 presents one embodiment of certain steps and/or operations for facilitating the management of exclusive access requests in systems exhibiting read-mostly workload periods according to the herein disclosed techniques. In one or more embodiments, the steps and underlying operations comprising exclusive access management technique 3B00 can be executed by an instance of the concurrency object state manager 164 as shown and described in FIG. 1D and herein.

As shown in FIG. 3B, exclusive access management technique 3B00 can listen for exclusive resource access requests (at step 352). When a successful exclusive access request is detected (at step 354), the concurrency object state for the requested shared resource can be determined (at step 356). If the concurrency object is in the FREE state, the concurrency object state is transitioned to the EXCLUSIVE state (at step $358_1$). When a successful exclusive access request is detected in the EXCLUSIVE state or invokes a transition to the EXCLUSIVE state, an exclusive get associated with the exclusive access request can be executed (at step 360). In some cases, the concurrency object state might be transitioned to the FREE state when the exclusive get is completed.

Other transition paths to the EXCLUSIVE state are possible. For example, if the exclusive access request is detected while the concurrency object is in the SHARED state, the shared resource can be transitioned to the EXCLUSIVE WAIT state (at step 362). In the EXCLUSIVE WAIT state, any pending shared gets can be executed (at step $364_1$). When the pending shared gets are executed, the concurrency object can be transitioned to the EXCLUSIVE state (at step $358_2$) to execute the exclusive get (at step 360). Further, if the exclusive access request is detected while the concurrency object is in the SUPER SHARED state, the concurrency object can be transitioned to the SUPER SHARED CONVERSION state (at step 368). When a successful exclusive access request is detected in the SUPER SHARED CONVERSION state, or invokes a transition to the SUPER SHARED CONVERSION state, any pending shared gets can be executed (at step $364_2$). When the pending shared gets are executed, the concurrency object can be transitioned to the EXCLUSIVE state (at step $358_3$) to execute the exclusive get (at step 360).

Additional Embodiments of the Disclosure

Additional Practical Application Examples

Figure 4:
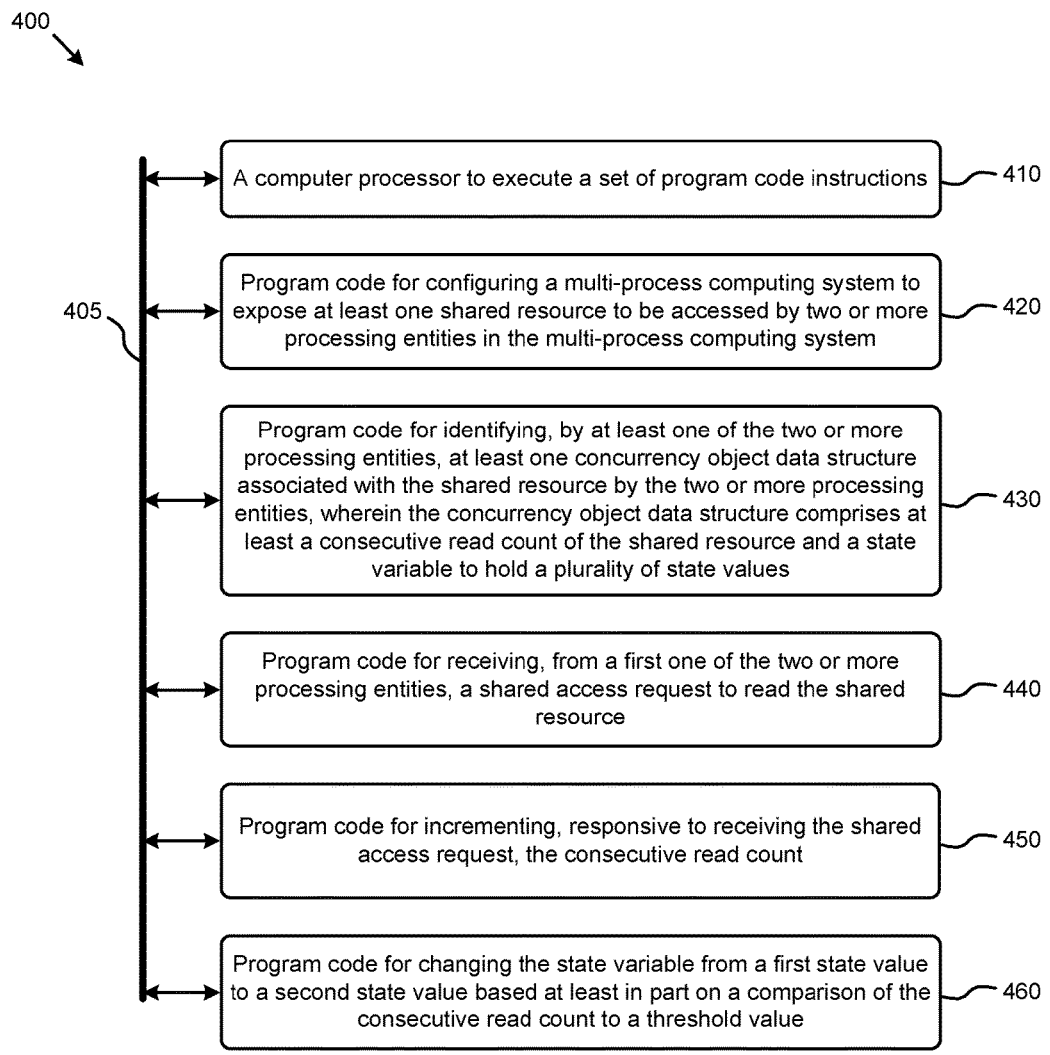
FIG. 4 depicts system components as arrangements of computing modules that are interconnected so as to implement certain of the herein-disclosed embodiments.

FIG. 4 depicts a system 400 as an arrangement of computing modules that are interconnected so as to operate cooperatively to implement certain of the herein-disclosed embodiments. The partitioning of system 400 is merely illustrative and other partitions are possible. As an option, the system 400 may be implemented in the context of the architecture and functionality of the embodiments described herein. Of course, however, the system 400 or any operation therein may be carried out in any desired environment.

The system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. Any operations performed within system 400 may be performed in any order unless as may be specified in the claims.

The shown embodiment implements a portion of a computer system, presented as system 400, comprising a computer processor to execute a set of program code instructions (module 410) and modules for accessing memory to hold program code instructions to perform: configuring a multi-process computing system to expose at least one shared resource to be accessed by two or more processing entities in the multi-process computing system (module 420); identifying, by at least one of the two or more processing entities, at least one concurrency object data structure associated with the shared resource by the two or more processing entities, wherein the concurrency object data structure comprises at least a consecutive read count of the shared resource and a state variable to hold a plurality of state values (module 430); receiving, from a first one of the two or more processing entities, a shared access request to read the shared resource (module 440); incrementing, responsive to receiving the shared access request, the consecutive read count (module 450); and changing the state variable from a first state value to a second state value based at least in part on a comparison of the consecutive read count to a threshold value (module 460).

Variations of the foregoing may include more or fewer of the shown modules and variations may perform more or fewer (or different) steps, and/or may use data elements in more, or in fewer (or different) operations.

System Architecture Overview

Additional System Architecture Examples

Figure 5:
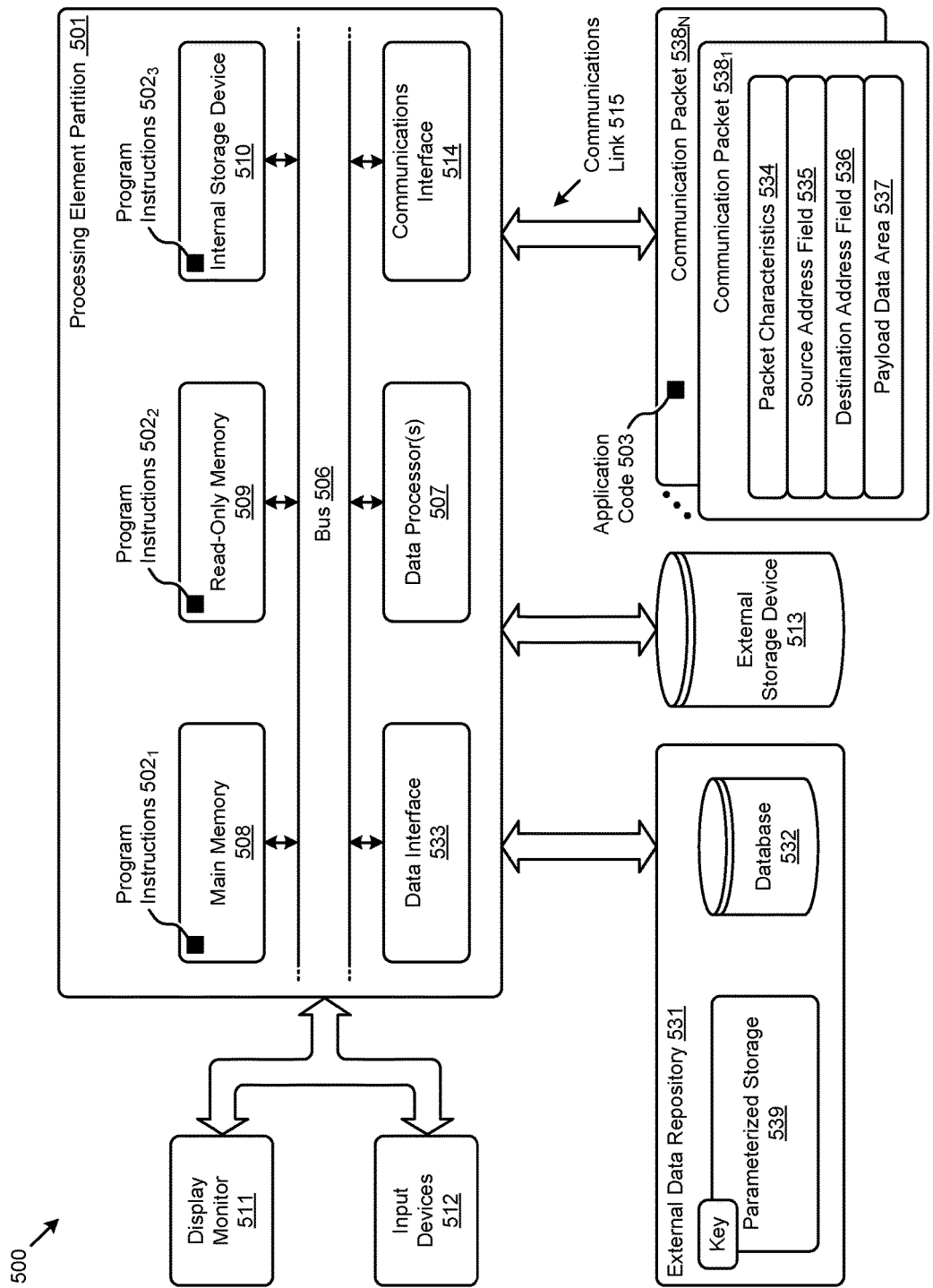
FIG. 5 depicts exemplary architectures of components suitable for implementing embodiments of the present disclosure and/or for use in the herein-described environments.

FIG. 5 depicts a block diagram of an instance of a computer system 500 suitable for implementing embodiments of the present disclosure. Computer system 500 includes a bus 506 or other communication mechanism for communicating information. The bus interconnects subsystems and devices such as a CPU, or a multi-core CPU (e.g., data processor 507), a system memory (e.g., main memory 508, or an area of random access memory (RAM)), a non-volatile storage device or non-volatile storage area (e.g., read-only memory 509), an internal storage device 510 or external storage device 513 (e.g., magnetic or optical), a data interface 533, a communications interface 514 (e.g., PHY, MAC, Ethernet interface, modem, etc.). The aforementioned components are shown within processing element partition 501 however other partitions are possible. The shown computer system 500 further comprises a display 511 (e.g., CRT or LCD), various input devices 512 (e.g., keyboard, cursor control), and an external data repository 531.

According to an embodiment of the disclosure, computer system 500 performs specific operations by data processor 507 executing one or more sequences of one or more program code instructions contained in a memory. Such instructions (e.g., program instructions $502_1$, program instructions $502_2$, program instructions $502_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 500 performs specific networking operations using one or more instances of communications interface 514. Instances of the communications interface 514 may comprise one or more networking ports that are configurable (e.g., pertaining to speed, protocol, physical layer characteristics, media access characteristics, etc.) and any particular instance of the communications interface 514 or port thereto can be configured differently from any other particular instance. Portions of a communication protocol can be carried out in whole or in part by any instance of the communications interface 514, and data (e.g., packets, data structures, bit fields, etc.) can be positioned in storage locations within communications interface 514, or within system memory, and such data can be accessed (e.g., using random access addressing, or using direct memory access DMA, etc.) by devices such as data processor 507.

The communications link 515 can be configured to transmit (e.g., send, receive, signal, etc.) any types of communications packets (e.g., communications packet $538_1$, communications packet $538_N$) comprising any organization of data items. The data items can comprise a payload data area 537, a destination address 536 (e.g., a destination IP address), a source address 535 (e.g., a source IP address), and can include various encodings or formatting of bit fields to populate the shown packet characteristics 534. In some cases the packet characteristics include a version identifier, a packet or payload length, a traffic class, a flow label, etc. In some cases the payload data area 537 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 507 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 531, which in turn can be formatted into any one or more storage areas, and which can comprise parameterized storage 539 accessible by a key (e.g., filename, table name, block address, offset address, etc.).

Execution of the sequences of instructions to practice certain embodiments of the disclosure are performed by a single instance of the computer system 500. According to certain embodiments of the disclosure, two or more instances of computer system 500 coupled by a communications link 515 (e.g., LAN, PTSN, or wireless network) may perform the sequence of instructions required to practice embodiments of the disclosure using two or more instances of components of computer system 500.

The computer system 500 may transmit and receive messages such as data and/or instructions organized into a data structure (e.g., communications packets). The data structure can include program instructions (e.g., application code 503), communicated through communications link 515 and communications interface 514. Received program code may be executed by data processor 507 as it is received and/or stored in the shown storage device or in or upon any other non-volatile storage for later execution. Computer system 500 may communicate through a data interface 533 to a database 532 on an external data repository 531. Data items in a database can be accessed using a primary key (e.g., a relational database primary key).

The processing element partition 501 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 507. Some embodiments include one or more special-purpose hardware components (e.g., power control, logic, sensors, transducers, etc.). A module may include one or more state machines and/or combinational logic used to implement or facilitate the operational and/or performance characteristics of lockless execution in read-mostly workloads.

Various implementations of the database 532 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of lockless execution in read-mostly workloads. Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for lockless access to a resource in a computing environment, comprising:
    exposing at least one shared resource to be accessed by two or more processing entities in the computing environment;
    forming a data structure associated with the shared resource wherein the data structure comprises:
        a consecutive read count value that indicates a number of consecutive read access requests to the shared resource, wherein the consecutive read access requests are successful contiguously-successive read-only access requests for the shared resources by the two or more processing entities, and
        a state variable to hold a plurality of state values;
    receiving, from a first one of the two or more processing entities, a shared access request to read the shared resource, the shared access request corresponding to a read-only access request;
    incrementing, responsive to receiving the shared access request, the consecutive read count value; and
    changing the state variable from a first state value to a second state value based at least in part on a comparison of the consecutive read count value to a threshold value, wherein the first state value indicates locks are needed to facilitate the shared access request and the second state value indicates locks are not needed to facilitate the shared access request.

2. The method of claim 1, wherein the first state value is a SHARED state, and the second value is a SUPER SHARED state, the SUPER SHARED state facilitating shared access to the at least one shared resource using a low latency technique for providing a grant to a reader without an explicit grant of a read-only lock.

3. The method of claim 1, further comprising receiving, after the changing of the state variable from the first state value to the second state value, a further shared access request to read the share resource and, responsive to the further shared access request, granting access to the shared resource without executing an atomic operation.

4. The method of claim 1, further comprising receiving, from a second one of the two or more processing entities after the changing of the state variable from the first state value to the second state value, an exclusive access request to access the shared resource.

5. The method of claim 4, further comprising resetting the consecutive read count value, the resetting being responsive to receiving the exclusive access request.

6. The method of claim 5, further comprising entering a time period to wait for confirmation of release of pending shared access grants.

7. The method of claim 6, further comprising processing the exclusive access request in response to the confirmation of the release of the pending shared access grants.

8. A computer readable medium, embodied in a non-transitory computer readable medium, the non-transitory computer readable medium having stored thereon a sequence of instructions which, when stored in memory and executed by one or more processors causes the one or more processors to perform a set of acts for lockless access to a resource in a computing environment, the acts comprising:
    exposing at least one shared resource to be accessed by two or more processing entities in the computing environment;
    forming a data structure associated with the shared resource wherein the data structure comprises:
        a consecutive read count value that indicates a number of consecutive read access requests to the shared resource, wherein the consecutive read access requests are successful contiguously-successive read-only access requests for the shared resources by the two or more processing entities, and
        a state variable to hold a plurality of state values;
    receiving, from a first one of the two or more processing entities, a shared access request to read the shared resource, the shared access request corresponding to a read-only access request;
    incrementing, responsive to receiving the shared access request, the consecutive read count value; and changing the state variable from a first state value to a second state value based at least in part on a comparison of the consecutive read count value to a threshold value, wherein the first state value indicates locks are needed to facilitate the shared access request and the second state value indicates locks are not needed to facilitate the shared access request.

9. The computer readable medium of claim 8, wherein the first state value is a SHARED state, and the second value is a SUPER SHARED state, the SUPER SHARED state facilitating shared access to the at least one shared resource using a low latency technique for providing a grant to a reader without an explicit grant of a read-only lock.

10. The computer readable medium of claim 8, further comprising instructions which, when stored in memory and executed by the one or more processors causes the one or more processors to perform acts of receiving, after the changing of the state variable from the first state value to the second state value, a further shared access request to read the share resource and, responsive to the further shared access request, granting access to the shared resource without executing an atomic operation.

11. The computer readable medium of claim 8, further comprising instructions which, when stored in memory and executed by the one or more processors causes the one or more processors to perform acts of receiving, from a second one of the two or more processing entities after the changing of the state variable from the first state value to the second state value, an exclusive access request to access the shared resource.

12. The computer readable medium of claim 11, further comprising instructions which, when stored in memory and executed by the one or more processors causes the one or more processors to perform acts of resetting the consecutive read count value, the resetting being responsive to receiving the exclusive access request.

13. The computer readable medium of claim 12, further comprising instructions which, when stored in memory and executed by the one or more processors causes the one or more processors to perform acts of entering a time period to wait for confirmation of release of pending shared access grants.

14. The computer readable medium of claim 13, further comprising instructions which, when stored in memory and executed by the one or more processors causes the one or more processors to perform acts of processing the exclusive access request in response to the confirmation of the release of the pending shared access grants.

15. A system for lockless access to a resource in a computing environment comprising:
a storage medium having stored thereon a sequence of instructions; and
one or more processors that execute the instructions to cause the one or more processors to perform a set of acts, the acts comprising,
exposing at least one shared resource to be accessed by two or more processing entities in the computing environment;
forming a data structure associated with the shared resource wherein the data structure comprises:
a consecutive read count value that indicates a number of consecutive read access requests to the shared resource, wherein the consecutive read access requests are successful contiguously-successive read-only access requests for the shared resources by the two or more processing entities, and
a state variable to hold a plurality of state values;
receiving, from a first one of the two or more processing entities, a shared access request to read the shared resource, the shared access request corresponding to a read-only access request;
incrementing, responsive to receiving the shared access request, the consecutive read count value; and
changing the state variable from a first state value to a second state value based at least in part on a comparison of the consecutive read count value to a threshold value, wherein the first state value indicates locks are needed to facilitate the shared access request and the second state value indicates locks are not needed to facilitate the shared access request.

16. The system of claim 15, wherein the first state value is a SHARED state, and the second value is a SUPER SHARED state, the SUPER SHARED state facilitating shared access to the at least one shared resource using a low latency technique for providing a grant to a reader without an explicit grant of a read-only lock.

17. The system of claim 15, further comprising instructions which, when stored in memory and executed by the one or more processors causes the one or more processors to perform acts of receiving, after the changing of the state variable from the first state value to the second state value, a further shared access request to read the share resource and, responsive to the further shared access request, granting access to the shared resource without executing an atomic operation.

18. The system of claim 15, further comprising instructions which, when stored in memory and executed by the one or more processors causes the one or more processors to perform acts of receiving, from a second one of the two or more processing entities after the changing of the state variable from the first state value to the second state value, an exclusive access request to access the shared resource.

19. The system of claim 18, further comprising instructions which, when stored in memory and executed by the one or more processors causes the one or more processors to perform acts of resetting the consecutive read count value, the resetting being responsive to receiving the exclusive access request.

20. The system of claim 19, further comprising instructions which, when stored in memory and executed by the one or more processors causes the one or more processors to perform acts of entering a time period to wait for confirmation of release of pending shared access grants.

* * * * *

UNITED STATES PATENT AND TRADEMARK OFFICE
CERTIFICATE OF CORRECTION

PATENT NO. : 10,248,471 B2
APPLICATION NO. : 15/267104
DATED : April 2, 2019
INVENTOR(S) : Rungta et al.

It is certified that error appears in the above-identified patent and that said Letters Patent is hereby corrected as shown below:

In the Specification

In Column 6, Line 23, delete "$104_1$," and insert -- $104_1$, --, therefor.

In Column 7, Line 30, delete "that that" and insert -- that --, therefor.

In Column 7, Line 33, delete "that that" and insert -- that --, therefor.

In Column 12, Line 63, Delete "α0" and insert -- a --, therefor.

In Column 16, Line 61, delete "PTSN," and insert -- PSTN, --, therefor.

Signed and Sealed this
Third Day of November, 2020

Andrei Iancu
*Director of the United States Patent and Trademark Office*